United States Patent [19]
Tsuchida et al.

[11] 3,926,678
[45] Dec. 16, 1975

[54] METHOD OF MANUFACTURING FUEL CELL ELECTRODES

[75] Inventors: Takashi Tsuchida, Shizuoka; Kenichi Shinoda, Aichi; Kohei Yamamoto, Shizuoka; Tomoya Murata, Shizuoka; Yoshihiro Maeda, Shizuoka, all of Japan

[73] Assignee: Fuji Electrochemical Co., Ltd., Tokyo, Japan

[22] Filed: July 2, 1973

[21] Appl. No.: 375,830

[30] Foreign Application Priority Data
Aug. 31, 1972 Japan................................ 47-86669

[52] U.S. Cl.............................. 136/122; 136/120 FC
[51] Int. Cl. ........................................ H01m 13/04
[58] Field of Search ........................... 136/120–122, 136/20, 75, 22, 86 D, 86 DD; 264/61, 104, 105, 127

[56] References Cited
UNITED STATES PATENTS

| | | | |
|---|---|---|---|
| 3,212,936 | 10/1965 | McEvoy et al................. | 136/120 FC |
| 3,306,779 | 2/1967 | Flannery et al.............. | 136/120 FC |
| 3,385,736 | 5/1968 | Deibert......................... | 136/120 FC |
| 3,388,004 | 6/1968 | Rosenblatt.................... | 136/120 FC |
| 3,393,100 | 7/1968 | Niedrach ...................... | 136/120 FC |
| 3,395,049 | 7/1968 | Thompson .......................... | 136/122 |
| 3,488,225 | 1/1970 | Selker et al.................... | 136/121 X |
| 3,553,029 | 1/1971 | Kordesch et al............... | 136/121 X |
| 3,558,365 | 1/1971 | Duddy .......................... | 136/120 FC |
| 3,595,700 | 7/1971 | Rosansky...................... | 136/86 A X |
| 3,733,221 | 5/1973 | Sandler et al................. | 136/120 FC |

Primary Examiner—Anthony Skapars
Attorney, Agent, or Firm—Eliot S. Gerber

[57] ABSTRACT

There is provided a method of manufacturing an electrode for a fuel cell which comprises kneading a mixture of silver oxide powder and active carbon powder with a water-repellent binder, molding the kneaded mixture to a thin catalyst layer, heating it under pressure to effect drying and activation of the catalyst simultaneously, and integrating the resulting thin catalyst layer with a metallic collector net and a gas-permeable film by application of heat under pressure.

3 Claims, 5 Drawing Figures

METHOD OF MANUFACTURING FUEL CELL ELECTRODES

BACKGROUND OF THE INVENTION

This invention relates to a method of manufacturing an electrode for a zinc-air cell or a fuel cell. More particularly, the invention relates to a method of manufacturing an oxygen electrode for a fuel cell having an excellent oxygen-ionizing catalyst layer.

A catalyst promoting the ionization of oxygen is usually employed in an oxygen electrode of an air cell or fuel cell of this type, and porous active carbon, Raney-nickel, Raney-silver, silver, platinum and the like are used as such catalyst.

As a method of manufacturing an electrode using an oxygen-ionizing catalyst, there has been known and practised a method comprising forming a thin layer of a catalyst, laminating this thin catalyst layer with a porous thin layer having an air permeability and a water-repellent property and a collector net composed of nickel or the like, and integrating the laminated layers by bonding under heat and pressure (see, for instance, the specification of U.S. Pat. No. 3,595,700).

The polarizing characteristics of such electrode formed with use of a noble metal catalyst such as silver and platinum are generally superior to those of an electrode formed with use of a cheap active carbon catalyst. However, such noble metal catalysts are expensive and even when noble metals are employed, the polarizing characteristics of resulting electrodes are not sufficiently satisfactory.

When a catalyst layer containing such a catalyst as mentioned above, e.g., silver, is prepared, there is adopted a method comprising kneading silver oxide powder with a water-repellent binder such as polytetrafluoroethylene, molding the kneaded mixture to a thin layer, heating the layer to reduce silver oxide to metallic silver and thus activating the catalyst. In this method, the heating temperature adopted gives a great influence to the characteristics of the resulting electrode and the discharge characteristics and electrolyte leakage resistance of the cell formed with use of the resulting electrode. More specifically, in case the heating temperature is too low, since silver oxide is not completely converted to metallic silver, the catalyst is not sufficiently activated, and remaining silver oxide is dissolved in an alkaline electrolyte to form voids causing leakage of the electrolyte. In case the heating temperature is too high, the electrode strength is lowered, resulting similarly in leakage of the electrolyte.

SUMMARY OF THE INVENTION

It is a primary object of this invention to provide a method of manufacturing an electrode for a fuel cell having excellent polarizing characteristics at a very low cost.

Another object of this invention is to provide a method of manufacturing an electrode for a fuel cell which has good discharge characteristics and is excellent in the electrolyte leakage resistance, and the life of which is very long.

According to this invention, a mixture of silver oxide powder and active carbon powder is kneaded with a water-repellent binder such as an aqueous dispersion of polytetrafluoroethylene, the resulting kneaded mixture is molded to a thin layer to produce a thin catalyst layer, and the thin catalyst layer is heated under pressure to effect drying and activation of the catalyst simultaneously. It is preferred that the mixing weight ratio of silver oxide powder and active carbon powder is within a range of from 1 : 2 to 2 : 1. It is also preferred that the heating temperature is adjusted to 300° to 400°C. The resulting thin layer of the catalyst is laminated with a collector net composed of such a metal as nickel and a gas-permeating film composed of polytetrafluoroethylene or the like, and the laminated assembly is integrated under heat and pressure to obtain an intended electrode.

DETAILED DESCRIPTION OF THE PREFERRED EMBODIMENT:

This invention has been achieved based on the finding that a mixture of silver oxide powder and active carbon powder has an excellent effect as an oxygen-ionizing catalyst to be used for manufacture of an electrode for a fuel cell.

Figure 1:
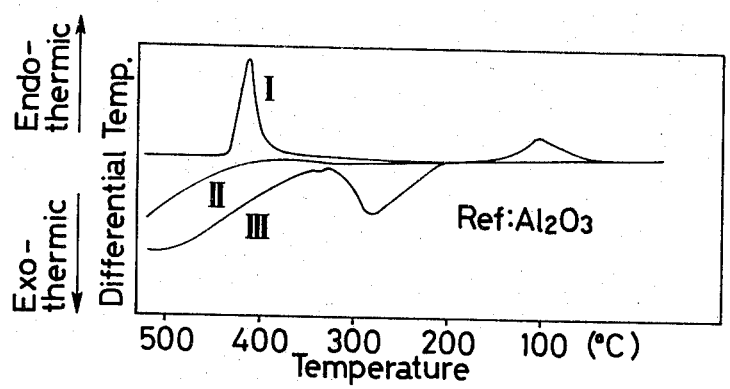
FIG. 1 is a graph illustrating the results of the differential thermal analysis of a silver oxide-active carbon mixture.

In FIG. 1 there are illustrated differential thermal curves of silver oxide alone (curve I), active carbon alone (curve II) and a mixture of silver oxide and active carbon (curve III). In the differential thermal analysis alumina was used as a reference substance and the temperature was elevated at a rate of 10°C. per minute. From these curves, it is seen that in the case of silver oxide alone a temperature exceeding 400°C. is necessary to obtain metallic silver having an excellent catalytic activity but in the case of a mixture of silver oxide with active carbon an effective metalic silver catalyst can be obtained at a temperature lower by about 100°C. than in the case of silver oxide alone. In short, from the curves illustrated in FIG. 1 it is seen that catalyst activation can be performed sufficiently at low temperatures in the case of a mixture of silver oxide and active carbon. This is considered to be due to the fact that combustion of active carbon is caused to occur by a mutual catalytic activity of silver oxide and active carbon and this combustion results in formation of metallic silver.

Figure 2:
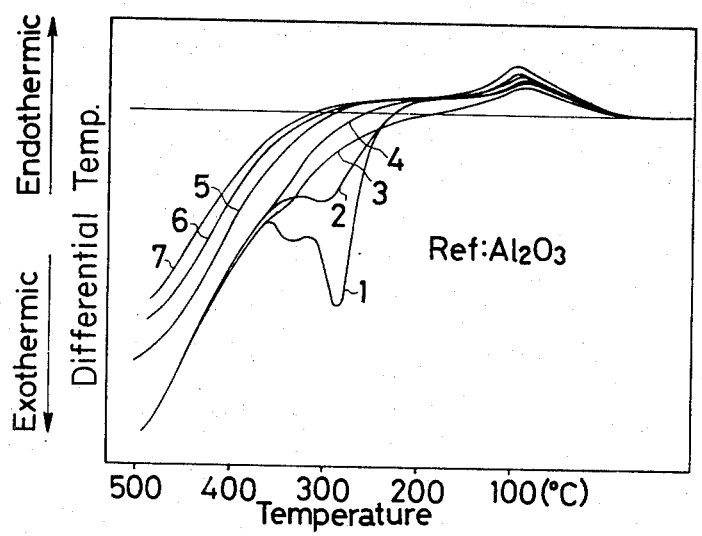
FIGS. 2-a and 2-b are differential thermal curves and thermogravimetric curves of products obtained by heating a silver oxide-active carbon mixture at various temperatures.
Figure 2:
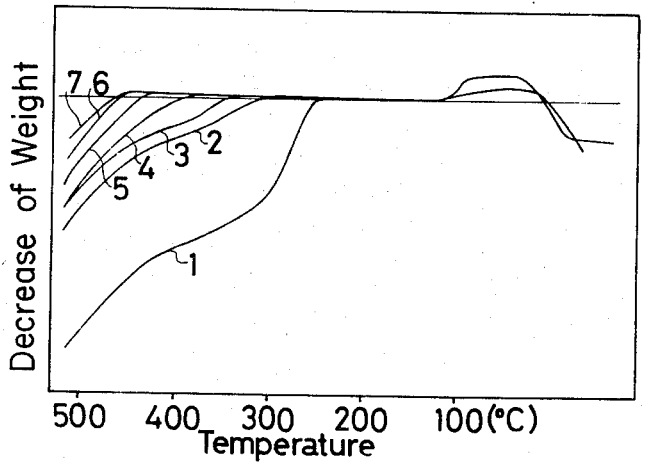

FIG. 2-a shows differential thermal curves of products obtained by heat treating a 1 : 1 (weight ratio) mixture of silver oxide and active carbon for 15 minutes at various temperatures, and FIG. 2-b shows thermogravimetric curves of such heat-treated products. In FIGS. 2-a and 2-b, referential numerals 1, 2, 3, 4, 5, 6, and 7 indicate heat treatment temperatures of 250°C., 270°C., 290°C., 300°C., 310°C., 350°C. and 380°C., respectively. At each test the temperature was elevated at a rate of 10°C. per minute and alumina was used as a reference substance for the differential thermal analysis. From the results shown in FIGS. 2-a and 2-b, it is seen that with elevation of the heat treatment temperature the differential thermal peak observed in the vicinity of 300°C. decreases and formation of metallic silver is confirmed by this decrease of the differential thermal peak. From the decrease of the thermal differential peak and ignition loss in weight shown in FIGS. 2-a and 2-b, it is seen that in order to obtain metallic silver effective as a catalyst for an electrode of a fuel cell, it is preferred that a mixture of silver oxide and active carbon is heated at a temperature exceeding 300°C. In case the heat treatment temperature is not higher than 300°C., silver oxide cannot be completely converted to metallic silver, and when remaining silver oxide is dissolved in an alkaline electrolyte having a contact with an electrode, voids and pores are formed in the electrode, causing leakage of the electrolyte. From the results of tests conducted separately, it was confirmed that when the heat treatment temperature exceeds 400°C., the strength of the resulting electrode decreases to cause leakage of the electrolyte. This is considered to be due to the fact that at such a high temperature excessive combustion of active carbon is caused to occur and the bonding state among particles becomes rough, with the result that great pores or strains are formed. In view of the foregoing, it is preferred that a mixture of silver oxide and active carbon is heat-treated at a temperature ranging from about 300°C. to about 400°C.

The following experiments were carried out in order to find a preferred mixing ratio of silver oxide and active carbon. Silver oxide powder passable through a sieve of 300 mesh and active carbon powder passable through a sieve of 400 mesh were mixed at various mixing ratios. Each mixture was added to about 10% by weight, based on the mixture, of an aqueous dispersion of polytetrafluoroethylene (composed of 60% by weight of polytetrafluoroethylene and 40% by weight of water) and the resulting mixture was kneaded and molded to a thin catalyst layer having a thickness of about 0.3 mm by means of a pressing roll. The resulting layer was dried at 350°C. under a pressure of 1000 Kg/cm$^2$ for about 3 minutes to make it water-repellent and decompose thermally silver oxide to metallic silver. The resulting thin layer of the catalyst was laminated with a gas-permeable film of polytetrafluoroethylene having pores of a diameter of 1 to 5$\mu$ and a collector net knitted with nickel wires in such a manner that the collector net was inserted between the thin catalyst layer and the gas-permeable film, and the laminated assembly was pressed at 80°C. under a pressure of 300 Kg/cm$^2$ for about 5 seconds to integrate the assembly. Thus were prepared gas diffusion electrodes of this invention.

It is possible to employ a nickel-stainless steel expanded metal instead of the above metal net knitted with nickel wires. Further, it is permissible to employ a laminated structure comprising two thin catalyst layers, a metal net collector inserted between the two thin catalyst layers, and a gas permeable film disposed on one of the two thin catalyst layers.

Each of the electrodes prepared by the above method was dipped in a 7N aqueous solution of KOH on the side of the catalyst layer, and the side of the gas-permeable polytetrafluoroethylene film was contacted with air. A nickel plate was used as a counter electrode and a silver oxide electrode was disposed as a reference electrode. The cathodic polarization was effected at 0.2 V and the current density was measured at 25°C. The relation between the mixing ratio of silver oxide and active carbon and the intensity of the current density measured by the above method is shown in the curve of FIG. 3.

Figure 3:
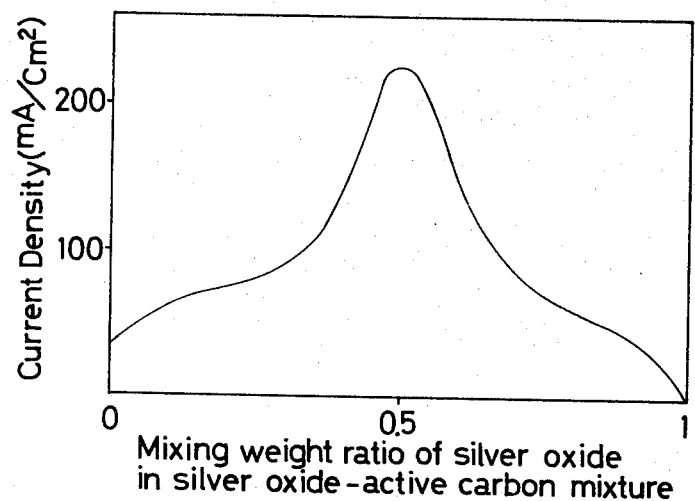
FIG. 3 is a graph illustrating the relation between the mixing ratio of silver oxide and active carbon and the current density of the resulting electrode.

From the results shown in FIG. 3, it is seen that a high current density is obtainable at a silver oxide-active carbon mixing weight ratio ranging from 1 : 2 to 2 : 1 and an excellent electrode can be provided when silver oxide and active carbon are used at such mixing ratio.

Figure 4:
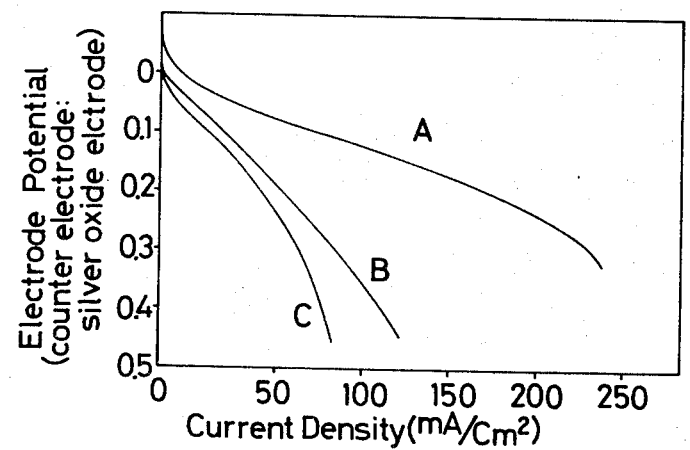
FIG. 4 is a graph illustrating the polarizing characteristics of an electrode prepared according to this invention and comparative electrodes prepared by employing a catalyst layer composed of silver oxide or active carbon alone.

FIG. 4 illustrates the polarizing characteristics of the electrode of this invention manufactured with use of a catalyst layer formed by employing a mixture containing silver oxide and active carbon at a mixing weight ratio of 1 : 1 in the same manner as described above. The polarizing characteristics of the electrode prepared according to this invention were determined in the same manner as described above to obtain a curve A in FIG. 4. For comparison, electrodes prepared in the same manner as described above by employing a catalyst layer formed of silver oxide or active carbon alone were tested in the same manner to obtain curves B and C, respectively. From the results shown in FIG. 4, it is seen that the polarizing characteristics of the electrode prepared according to this invention are much excellent over the polarizing characteristics of electrodes prepared by employing silver oxide or active carbon alone as a catalyst.

As is seen from the foregoing description, the method of this invention can provide an electrode having good polarizing characteristics which is suitable as an oxygen electrode for a fuel cell or an air electrode for an air cell. Further, with use of such electrode of this invention, it is possible to provide a fuel cell or air cell having a long electrode life and being excellent in the electrolyte leakage resistance and the discharge characteristics.

What is claimed is:

1. A method of manufacturing an electrode for a fuel cell comprising the steps of kneading a mixture of silver oxide powder and active carbon powder with a water-repellent binder, the weight ratio of said silver oxide powder to said active carbon powder being within a range of 1:2 to 2:1, molding the kneaded mixture to a thin layer to produce a thin catalyst layer, heating said thin catalyst layer under pressure using a heating temperature of 300°C to 400°C to effect drying and activation of the catalyst simultaneously, and integrating said thin catalyst layer with a metallic collector net and a gas-permeable film by the application of heat and pressure.

2. A method of manufacturing an electrode for a fuel cell according to claim 1 wherein the thin catalyst layer is laminated on one surface of the metallic collector net and the gas-permeable film is laminated on the other surface of the metallic collector net, and the laminated assembly is integrated by application of heat and pressure.

3. A method of manufacturing an electrode for a fuel cell according to claim 1 wherein two thin catalyst layers are employed, one being disposed on one surface of the metallic collector net and the other being disposed on the other surface of the metallic collector net, the gas-permeable film is laminated on one of the two thin catalyst layers, and the laminated assembly is integrated by application of heat and pressure.

* * * * *